United States Patent [19]

Carstensen

[11] Patent Number: 4,872,253
[45] Date of Patent: Oct. 10, 1989

[54] APPARATUS AND METHOD FOR IMPROVING THE INTEGRITY OF COUPLING SECTIONS IN HIGH PERFORMANCE TUBING AND CASING

[76] Inventor: Kenneth J. Carstensen, 4540 No. 44th St., No. 70, Phoenix, Ariz. 85018

[21] Appl. No.: 105,339

[22] Filed: Oct. 7, 1987

[51] Int. Cl.$^4$ .................................................. B21D 39/00
[52] U.S. Cl. ......................................... 29/507; 29/523; 29/527.1; 29/530; 29/421.1; 166/187; 166/287; 166/380; 166/387; 264/36; 264/263; 285/18; 285/382.4
[58] Field of Search .................. 29/507, 522 R, 523, 29/527.1, 530, 421 R, 458; 166/187, 287, 295, 387, 380; 285/18, 382.4; 403/5, 36, 268, 297; 264/36, 262, 263, 269

[56] References Cited

U.S. PATENT DOCUMENTS

| | | | |
|---|---|---|---|
| 3,355,226 | 11/1967 | Portz | 403/268 |
| 4,120,083 | 10/1978 | Echols | 29/458 |
| 4,132,437 | 1/1979 | Green | 29/523 X |
| 4,153,656 | 5/1979 | Bunyan | 264/269 X |
| 4,368,571 | 1/1983 | Cooper, Jr. | 29/421 R |
| 4,398,754 | 8/1983 | Caroleo et al. | 156/294 X |
| 4,507,842 | 4/1985 | Werner | 29/458 X |
| 4,714,377 | 12/1987 | Sandt et al. | 264/263 X |

Primary Examiner—Mark Rosenbaum
Assistant Examiner—Frances Chin
Attorney, Agent, or Firm—Merchant & Gould

[57] ABSTRACT

A system and method for improving the seal integrity and useful life of tubing and casing strings fills the volume between the nose ends of facing tubing sections and the collar to which they are mutually joined with a temperature and corrosion resistant element having a smooth interior surface substantially flush with the inner diameter of the tubing or casing. During makeup of each successive section of the drill string, a center fill tool including an expansible tubular element is seated below the coupling area to be self-retained, by the use of pressure expansion of a cylindrical surface. A precise amount of a curable material is inserted into the volume bounded by the nose ends and the collars (the so-called "J area") and while the material is still flowable the coupling is made up by threading in of the next tubular element. When sufficient setting has taken place, which occurs quickly, a retrieving tool is lowered to grip the upper end of the insert which is configured internally to vent the pressurizing gas as upward force is exerted. Thus the center fill tool can be moved out of position and the string lowered into the well bore, the tool then being ready for makeup of the next succeeding coupling.

6 Claims, 5 Drawing Sheets

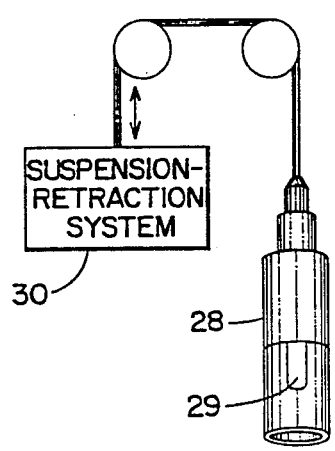
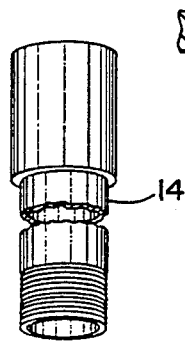
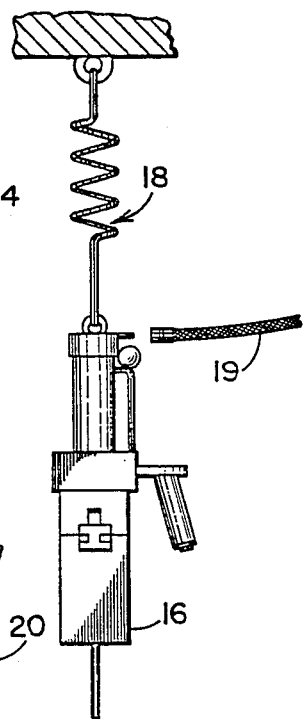
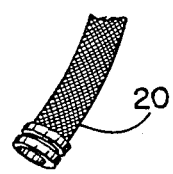
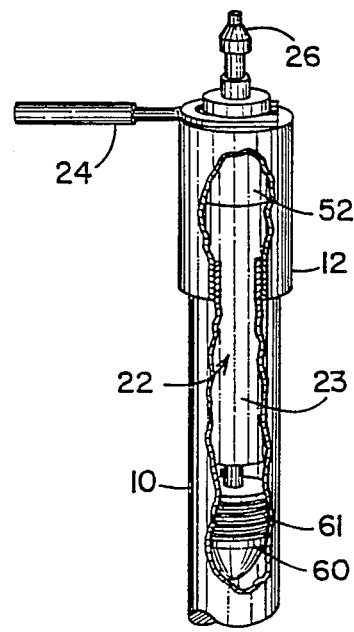

APPARATUS AND METHOD FOR IMPROVING THE INTEGRITY OF COUPLING SECTIONS IN HIGH PERFORMANCE TUBING AND CASING

BACKGROUND OF THE INVENTION

In tubular goods for high performance applications, such as those used in the oil fields, tubings and casings are widely made in accordance with the standards of the American Petroleum Institute (A.P.I.). The A.P.I. standards specify, for different sizes and grades of pipe, standards and acceptable tolerances for thread pitch thread dimensions and taper, and other characteristics. The geometries of the collars into which the threaded ends of the tubings or casings are to be engaged are similarly specified. The A.P.I. standard configurations leave open a central area between the beveled nose ends of the opposing tubular sections. This is called the "J area" and establishes a discontinuity between the inner diameter of the tubing or casing and the larger inner diameter of the central section of the collar. This abrupt inner profile discontinuity allows corrosive gases and liquids to penetrate into the threaded region, and also induces turbulence in flowing matter which accentuates the effects of the corrosive substances, especially when solids are entrained or injected in the fluids that are in the production stream.

To improve the durability and corrosion resistance of tubing and casing, a number of systems have been developed. Perhaps the most used of these is the so-called "Dual Lined" configuration, while a large number of installations also employ durable plastic coatings on the inside of the tubing. In a third category, the tubular goods are made of fiberglass reinforced resin, typically epoxy, while in a fourth category of installation a thin lining of cement is applied. In all of these expedients, the discontinuity, turbulence and exposed surfaces in the J area still present problems. Consequently, with these systems and also with prior art unlined connections, many attempts have been made to overcome the failures and difficulties. One approach has been to coat the J area surface with the same material as the tubing or casing coating. Another has been to use resilient elements interspersed between the opposing nose ends, for the purpose of providing a surface across the J area which is flush with the inner diameter of the tubing or casing. However, this presents a number of problems and heretofore has seldom been satisfactory, because of the tolerance variations permissible in production tubing and casing. If the interposed resilient element is not adequately compressed between the nose ends when the connection is made up, then leakage paths are created that induce corrosion and can tend to dislodge the resilient element. This can cause plugging of the tubing an surface production equipment. If the resilient element is too tightly engaged on opposite sides after makeup of the coupling, it bulges out into the path of the fluid moving along the tubular goods. The resilient element is quickly eroded or dislodged, and any such inward bulge impedes the passage of downhole tools. The inner diameter dimensions specified by the A.P.I. standards must be maintained to guard against these conditions.

The threaded ends of tubular goods are the portions most exposed to damage during handling, stabbing and makeup of a string. Chipping and cracking of the coating on surface areas at or near the ends often occurs in normal use. Moreover, the stresses and deformation introduced during makeup sometimes introduce new cracks in the coating, or accentuate prior existing defects. Close and thorough inspection for minute preexisting chips or cracks is not feasible under field conditions and is out of the question once the coupling has been made up.

Systems and methods for confronting these problems should be employable in the field in such manner as to achieve rapid makeup of tubing and casing strings while also providing assured protection against problems encountered in the J area of the couplings. They should reliably overcome the problems presented by standard A.P.I. couplings with 8 round or buttress thread under corrosive conditions.

SUMMARY OF THE INVENTION

In accordance with the invention, there is provided a system and method for uniform closure of the J area discontinuity and in situ repair of internal coating defects after couplings have been made up. The system is so arranged and operated that the normal sequence followed in making up a string of tubing or casing is very little delayed.

The principal unit employed is a cylindrical member that is movable with a sliding fit into the tubing or casing and has an expansible periphery. The cylindrical member is positioned slightly below the J area before the next succeeding tubing or casing section is stabbed into position. The expansible portion of the cylinder has a low friction surface that encompasses an interior chamber which can be pressurized. The cylindrical member also includes an adjacent rigid surface cylinder that is closely spaced from the walls of the tubing or casing and spans the J area. The cylinder also includes a central rod with interior conduits extending both along its length and transversely, and incorporating sliding valves in communication with the hollow chamber in the expansible portion. Valves at the upper end and at the lower (nose) end of the structure are selectively opened to control the flow of pressurized gas, in dependence upon the position of the rod within the cylindrical member. In one position, after insertion of the cylindrical member at the J area, the chamber is pressurized through the upper valve orifice to expand and grip the tubing or casing walls. In a second position, when the cylindrical member is to be extracted, the lower valve orifice opens a release path for the pressurized gas, so as to release the gripping force. The space between the rigid upper cylinder and the walls of the tubing or casing at the J area provides a limited and controlled gap which is filled with a fast curing sealant material between the time of insertion and release of the cylindrical member.

With this system and method, the cylindrical member is temporarily externally supported at its upper end on a collar threaded onto a tubing or casing section with the expansible portion being positioned inside the tubing or casing just below the J area. The expansible portion is then pressurized, locking the cylinder into place so that the upper support can be removed. A measured amount of rapidly curable sealant material, with catalyst, is injected into the J area space. Before the sealant material has rigidified, the next tubing or casing section is stabbed in and threaded into desired engagement depth. The upper tubing or casing section forces the sealant material to extrude on each side of the J area within the gap into a thin layer on the inner surface of the tubing member, while completely filling the J area. The sealant substantially rigidifies in a short time after makeup is complete and becomes self-supporting. A retrieving tool lowered through the upper tubing or casing section grasps the protruding upper end of the central rod so that the tubing or casing sections can be lowered for coupling of the next section. The downward motion of the tubing or casing exerts pull on the central rod, opening the lower valve to vent the internal pressure in the expansible portion and free the tubular element. The tubular element is drawn above the J area, wiping excess material in that region down to a predetermined thickness and leaving a substantially flush interior surface. The string may then be lowered until the next collar is in position for makeup of the next section, at which point the sequence is repeated.

The J area may be filled with sealant using a gas pressure powered gun with disposable cartridges and nozzle. Alternatively, the dispenser may be mounted in the cylindrical member itself.

BRIEF DESCRIPTION OF THE INVENTION

A better understanding of the invention may be had by reference to the following description, taken in conjunction with the accompanying figures, in which:

FIG. 1 is a simplified perspective view of the principal elements of a system and method in accordance with the invention as used on site;

DETAILED DESCRIPTION OF THE INVENTION

Figure 2:
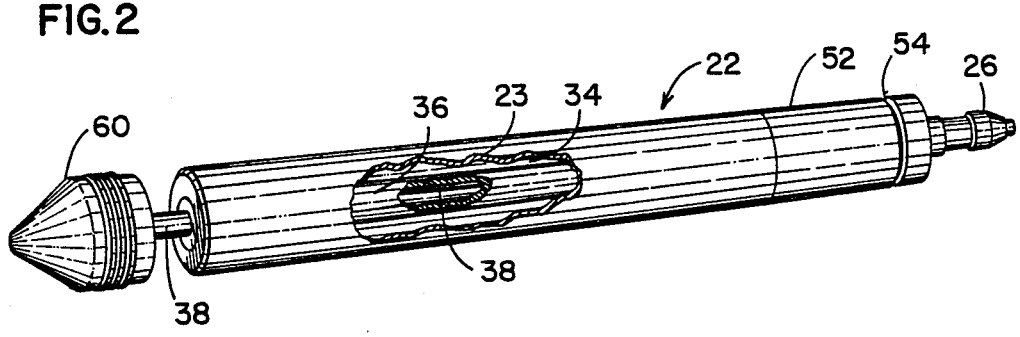
FIG. 2 is a perspective view, partially broken away, of a center fill tool in accordance with the invention.

A center fill tool system and method in accordance with the invention is shown as utilized in a typical on site application for oil or gas rigs. Conventional parts of such an installation, such as the rig floor, derrick, tongs and driving mechanisms have not been shown for brevity and simplicity and because many different conventional systems are available. In FIG. 1, the upper end of a first tubing or casing section 10 previously lowered into a well bore (not shown) is depicted with a previously made up collar 12 threaded onto its upper end to a desired depth or bearing pressure. An upper, second tubing or casing section 14 is suspended at the well rig in conventional fashion (not shown) so as to be readily lowered for stabbing and subsequent makeup, using power tongs or other means (not illustrated), to a desired thread engagement within the collar 12. When this joint is made up, as with standard A.P.I. tubing or casing, the anticipated gap between the opposing nose ends of the tubing or casing sections defines the J area, the discontinuous profile and potential leakage paths of which present significant problems, particularly in corrosive environments within the string. Moreover, the length of the J area is not closely predictable because tolerance variations can be additive or subtractive.

Prior to stabbing in of the upper tubing or casing section 14, use is made of a hand manipulated dispenser 16 for synthetic resin that is suspended from above the working area by a cable and spring hanger system 18 so as to be readily available for use prior to final makeup of the coupling. A gas pressure line 19 is coupled to the dispenser 16 for powered operation. A pressurized gas line 20 is also coupled to one end of a center fill tool 22 which is in the form of a cylindrical member or projectile which fits within the interior diameter of the tubings or casings. An inert gas such as nitrogen is used for safety to preclude mixing of combustible gases with gases in or from the tubing or casing. A removable mechanical retainer 24 in the form of a yoke seats temporarily on the upper end of the collar 12 to engage an upper end of the center fill tool 22 during initial positioning of the tool. The gas line 20 attaches to a valve stem 26 at the uppermost part of the center fill tool 22 to initiate internal retention of the tool within the first tubing or casing section 10, after which the gas line 20 is removed. Also used in the system is a retrieving tool 28 initially held near the upper end of the second tubing or casing section 14, on a suspension-retraction system 30. The retrieving tool 28 is a commercially available product that is lowered through the upper tubing or casing before the stabbing step begins. After makeup it is lowered a few feet more to grip the upper end of the center fill tool 22 and withdraw it upwardly as the string is lowered to the next position.

Figure 4:
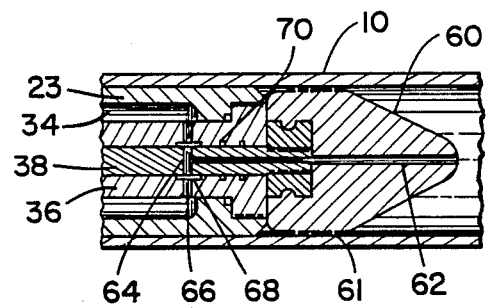
FIG. 4 is a fragmentary side sectional view of a portion of the center fill tool in a second mode of operation.
Figure 3:
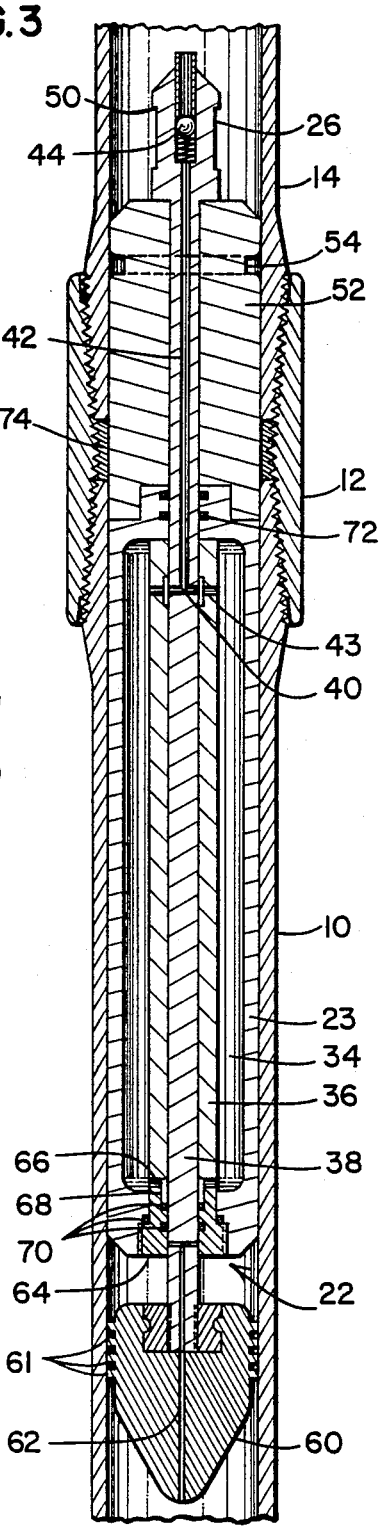
FIG. 3 is a side sectional view of the center fill tool of FIG. 2 as disposed in the coupling and in the pressurized mode of operation.

Referring now to FIGS. 2–4, the periphery of the center fill tool 22 includes an expansible cylindrical member 23 that defines an interior cylindrical hollow chamber 34. At least the outer parts of the tool 22 are of a material, such as "Teflon", to which a reactive synthetic resin will not adhere. The central portion of the tool 22 contains a coaxial steel sleeve 36 about an elongated central rod 38 which is displaceable and slidably movable in the sleeve 36. The rod 38 includes, adjacent its upper end, transverse orifices 40 communicating with an axial central gas flow orifice 42 extending along the central rod 38 from the valve stem 26 at the upper end of the rod 38. When the central rod 38 is in a first position, as seen in FIG. 3, the transverse orifices 40 are in alignment with radial apertures 43 in the sleeve 36. Nitrogen under pressure is supplied from the line 20 (not shown in these Figures) through a check valve 44 seated within the valve stem 26 and into the central orifice 42. The valve stem 26 includes a central section of reduced outer diameter that provides a shoulder 50 on the rod 38 which can be gripped by the retrieving tool 28. Above the expansible cylindrical element 23 and joined to it at its upper end, below the valve stem 26, is a collinear "Teflon" cylinder 52 whose principal outer diameter is only slightly smaller than the nominal inner diameter of the tubing sections 10, 14, so as to provide a small clearance gap (of the order of 0.010″). Alternatively this cylinder 52 may be of steel and coated with a non-adherent material such as "Teflon". At a distance above the J area this gap enlarges to provide greater clearance. A peripheral groove 54 about the cylinder 52 adjacent its upper end provides a recess in which the yoke-shaped exterior mechanical retainer 24 (FIG. 1 only) may be inserted to support the weight of the center fill tool 22 temporarily on the upper end of the collar 12.

The lower end of the central rod 38, referring again to FIGS. 2-4, protrudes outwardly below the ends of the steel sleeve 36 and the expansible cylindrical element 23 and is joined to a nose element 60 which is tapered for ready insertion of the tool 22 into the collar 12 in the lower tubing or casing section 10. Fins 61 on the nose 60 have an outer diameter which is 0.010" less than the nominal inner diameter of the tubing or casing. A second central axial orifice 62 extends through both the lower end of the central rod 38 and the nose element 60. This second central orifice 62 provides a venting path when lower transverse valve apertures 64 in the central rod 38 are shifted into alignment with radial vent holes 66 in the steel sleeve 36. This alignment permits communication between the internal chamber 34 and a venting gap 68 adjacent the central rod 38. In the first, non-venting, position of the central rod 38 relative to the body 23, a length of the rod 38 protrudes outside the bottom of the sleeve 36, and the radial valve apertures 64 are isolated from the venting gap 68 by O-rings 70. A second set of O-rings 72 is also provided at the upper end of the expansible tubing element, to block leakage outside the first valve orifices 40. A pressurized inert gas source (not shown) is attachable by the flexible gas line 20 (FIG. 1) to the valve stem 26, to provide gas pressure to expand the cylindrical element 32.

Thus, referring to FIGS. 1-4, the cyclic operation of the system can be said to start with initial placement of the center fill tool 22 within the collar 12 and the lower tubing or casing section 10. The mechanical retainer 24 is inserted to hold the center fill tool 22 at the upper end of the collar 12, and the retrieving tool 28 is released by opening side handles 29. For minimum delay, the retrieving tool 28 is initially fed down through the next section 14, so that it is supported within that section during stabbing and makeup. The rigid steel cylinder 52 of the tool 22 spans the J area with the expansible cylindrical element 23 is below the J area, as seen in FIG. 3. Engagement of the gas line 20 to the valve stem 26 forces nitrogen under pressure into the hollow chamber 34 via the upper central orifice 42 and upper radial orifices in the central rod 38 and the radial apertures 43 in the sleeve 36. The chamber 34 is effectively sealed in all other respects because the venting gap 68 is blocked off from the radial valve apertures 64 in the lower end of the rod 30 so that the venting path is not open. With the expansible cylindrical element 23 pressurized, a large gripping force secures the center fill tool 22 in position, and the mechanical retainer 24 and gas line 20 are removed.

Thread protectors (not shown) on the upper tubing or casing section 14 are removed before the J area is filled with resin, because otherwise variable delays can be introduced by this step. The resin dispenser 16 is then inserted about the upper end of the collar 12 and the J area is filled via an end nozzle with a premeasured, slightly excess, amount of sealant material 74. One example of a suitable material is "Isopaste 103" a high strength two-part adhesive supplied by Ashland Chemicals of Columbus, Oh.

Then the second tubing or casing section 14 is lowered into place and stabbed into the collar 12. The nose end of the section 14 engages the filler material 74 while it is still uncured and flowable. The force of threading hydraulically impels the filler material 74 throughout the J area. The filler material 74 subsequently squeezes upwardly into the small anticipated gap along the inner diameter of the tubing or casing sections 10, 14, adjacent the nose ends. The hydraulic force is sufficient in each case, despite dimensional variations in the tubing or casing, to insure complete fill of the J area and elimination of air pockets and voids. The overfill extends into the small gaps both above and below the J area, providing substantially flush interior diameters of shallow depth relative to the interior diameter of the tubing or casing sections 10, 14. The sealant cures rapidly during and after makeup, but is still sufficiently flowable as the coupling is made up to fill the internal volume. The fill material 74 cures rapidly and rigidifies in approximately 45 seconds after dispensing, under average 72° F. temperature conditions. This is a target time interval which can be adjusted by variation of the catalyst to account for variations in ambient temperature.

Makeup of the second tubing section 14 around the upper end of the center fill tool 22 proceeds without difficulty or impediment, using conventional techniques and power tong tightening. Then, the retrieving tool 28 is lowered the last short distance through the upper end of the second tubing section 14, down about the valve stem 26, to grip the shoulder 50 and lock the center fill tool 22 to the external support. Once this is done the tubing or casing string may be lowered, tending to draw the tool 22 downwardly with it. The retrieving tool 28 engagement to the valve stem 26, however, draws the central rod 38 upwardly relative to the body 23. This aligns the lower radial valve apertures 64 in the central rod 38 with the radial holes 66 and the vent gap 68 in the steel sleeve 36, thus releasing the internal pressure and relaxing the expansible cylindrical element 23 so as to release the entire center fill tool 22. The suspension-retraction system 30 then is used to pull the center fill tool 22 upwardly and feed it down through the next tubing or casing section to be added. When the string is lowered so that the next collar is at the desired horizontal position, the sequence is ready to be repeated, beginning with lowering the center fill tool 22 body below the J area as before. An operator inserts the mechanical retainer 24 into the peripheral groove 54 on the upper cylinder 52 and releases the retrieving tool 28 to free the center fill tool 22.

With this system and method, therefore, there results in the inclusion, in every successive J area in a string of tubulars, of a mechanically stable smooth surface filler that completely seals against leakage and conforms closely to the interior profile of the J area, regardless of tolerance variations. Further, the internal diameter at the nose end of each tubing section is slightly overcoated with an adhering layer that does not tend to peel away and does not provide a sharp corner or voids against which flowing gases and materials may interact.

Relative upward movement of the center fill tool 22 with respect to the J area as the sections are being lowered wipes the fins 61 on the nose element across any excess material coated above the J area, providing a final sizing and finishing of the still-hardening resin to a uniform internal diameter.

Typically, only about 20 seconds is added to a normal makeup operation, because most steps can take place concurrently with conventional rig operations. Placing and retaining the center fill tool 22 takes only 10-12 seconds, while dispensing, stabbing and makeup involve only about 20 seconds. With a short timed interval for curing the string can be lowered in normal fashion as the tool 22 is positioned for makeup of the next joint.

Figure 5:
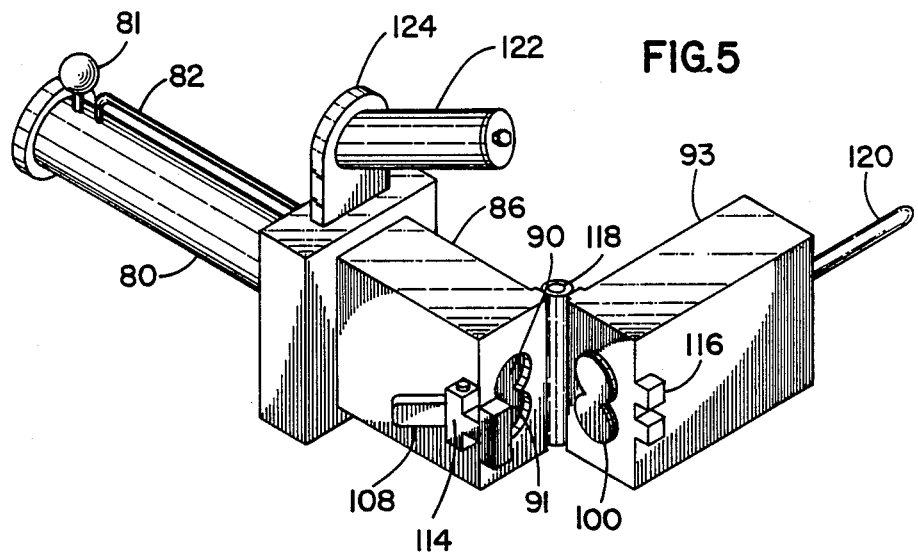
FIG. 5 is a perspective view, partially broken away, of a dispenser system for use in the arrangement of FIGS. 1–4.
Figure 6:
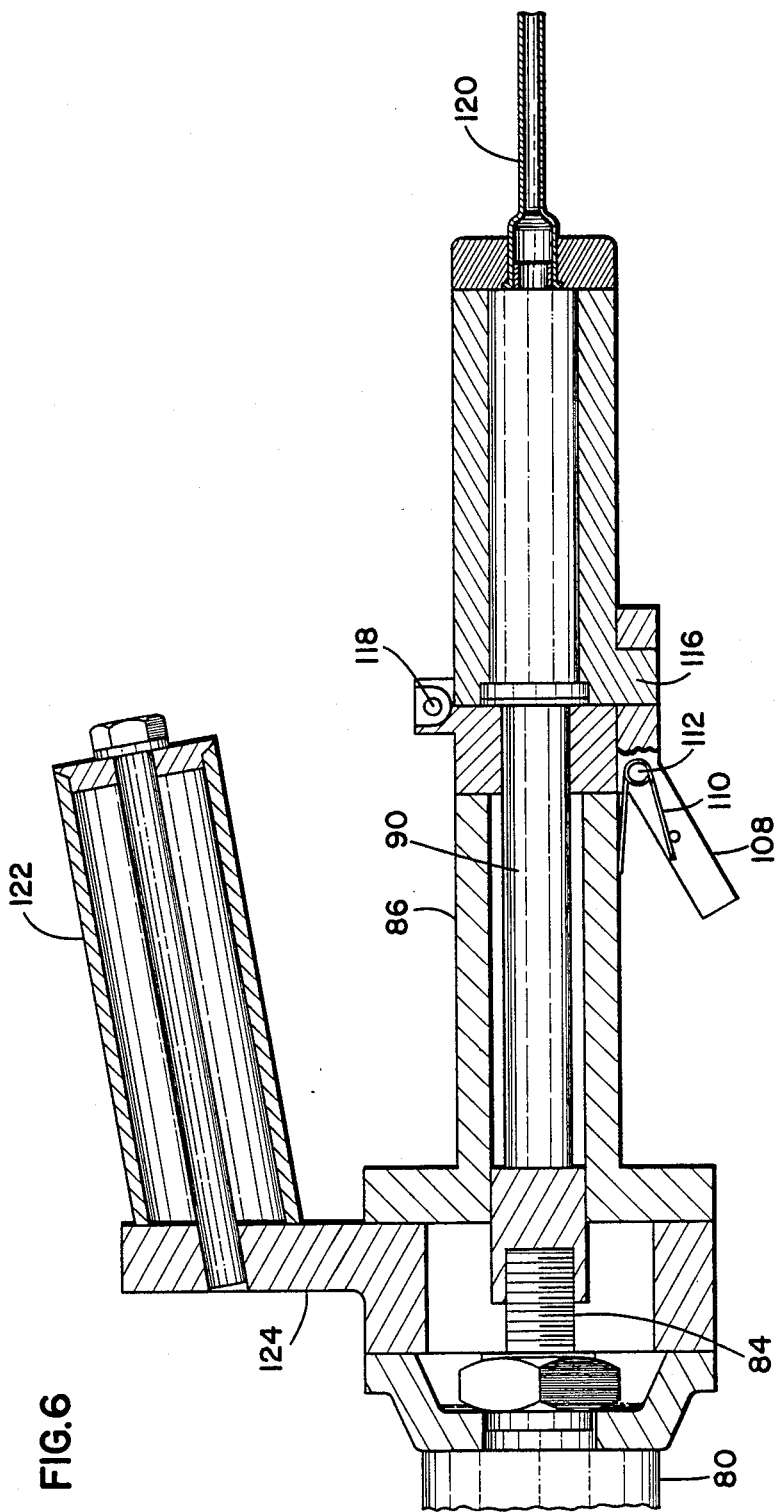
FIG. 6 is a side sectional view of the dispenser system of FIG. 5 showing further details thereof.
Figure 7:
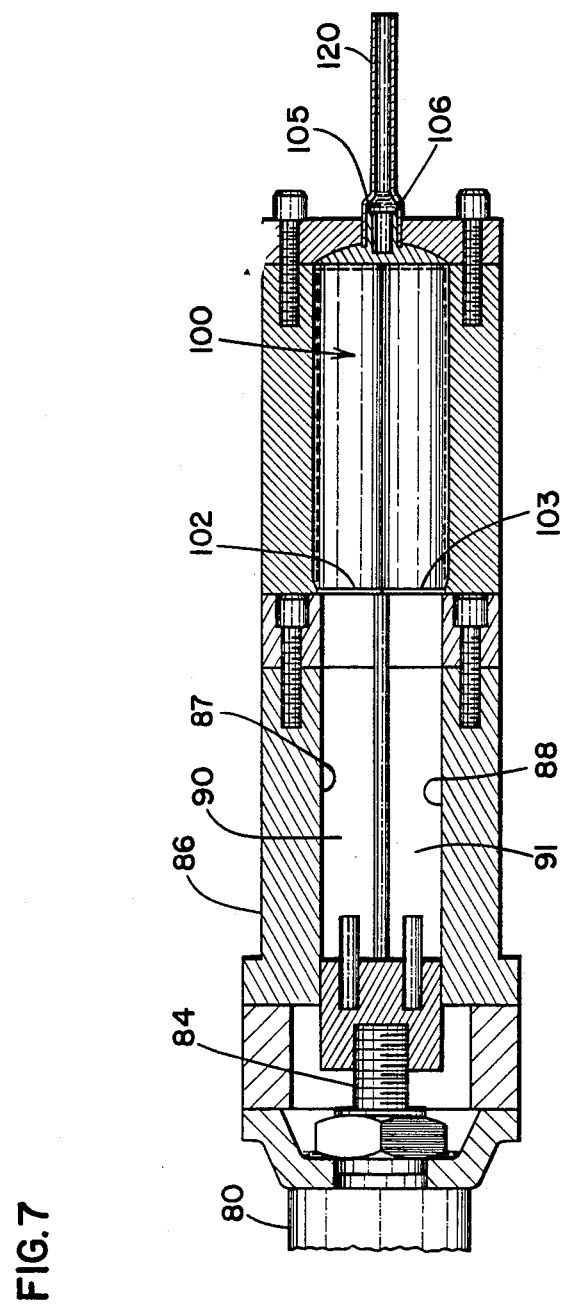
FIG. 7 is a top sectional view of a portion of the dispenser of FIGS. 5 and 6.

The dispenser system 16 is depicted in FIGS. 5 to 7, to which reference is no made. The driving force is provided by the gas line 20 shown in FIG. 1 to an "Allenair" cylinder 80 of the type sold by Air-Dreco, Inc. as Model No. 061-EV-VH-2×3-½, which includes a three-way valve 81 for controlling pressure, volumetric flow rate, and flow direction through the cylinder in a first direction or through a return line 82 in the opposite direction. A coaxial central shaft 84 from the cylinder 80 extends into a central dispenser body 86 including a pair of adjacent parallel piston cylinders 87, 88. Within these cylinders 87, 88 pistons 90, 91 are coupled to the end of the central shaft 84. When the limit of movement of the pistons 90, 91 is reached in the first direction within the cylinders 87, 88, nitrogen pressure through the return line forces the central shaft 84 and the pistons 90, 91 back to the initial position for a subsequent operation.

The body of the dispenser 16 includes a hinged terminal section 93 having a pair of adjacent cylinders 87, 88 for receiving a dual barreled cartridge 100 containing resin and catalyst. The cartridge 100 includes slidable O-ring seals 102, 103 in each barrel, and small reed valves 105, 106 covering outlets at the inserted ends. A lock handle 108 on the central body 86 can be pivoted inwardly against a spring 110 about a hinge pin 112 to release a lock member 114 from a pair of clogs 116 on the terminal section 93. This allows the section 93 to pivot about a hinge pin 118 on the central body in the manner of a breech block, exposing the cylinders 87, 88 to receive the dual barreled cartridge 100 as shown in FIG. 5 only. Each barrel of the cartridge 100 is in line with a different piston 90, 91 at the hinged end of the central body. The opposite outlet ends of the two tubes in the cartridge 100 are coupled to two conduit branches leading to an attachable end nozzle 120. An interior static mixer is disposed within the nozzle 120 near its head end. The end nozzle 120 has an elongated narrow terminal portion for insertion between the collar 14 and a center fill tool 22 that is inserted in the coupling so as to supply catalyzed resin into the J area The internal mixing head agitates as well as intermixes the resin and catalyst during expulsion to ensure full catalyzation as a measured quantity of the fast curing resin system is fed through the nozzle 120 into the center fill area.

Pressure and flow rates may be controlled by the adjustable valve 81 at the top end of the dispenser 16, which is held in a substantially vertical position, with the long end of the nozzle 120 extending into the opening between the center fill tool and the collar. Although the weight is largely supported on the hanger system 18, the mechanism may be manipulated by a side protruding handle 122 extending from a bracket 124 on the center body. It will be understood that all controls may be placed on the handle if desired.

In operation, therefore, with flow rate set by the control valve 81 set and measured quantities of catalyst and resin in the barrels of the cartridge 100, the operator merely turns on the control valve 81, so that the shaft 84 of the Allenair cylinder 80 urges the pistons 90, 91 forward. The slidable O-ring seals 102, 103 within the barrels of the cartridge 100 are driven to deliver measured quantities of resin and catalyst through the outlets of the cartridge 100 and the static mixing chamber in the end nozzle 120 into the gap between the tool 22 and the collar 12 that leads into the J area. When the limit position is reached, the pressurized nitrogen flow is automatically switched to flow through the return line 82, withdrawing the pistons 90, 91 to the starting position. The operator then removes the dispenser 16 from the work area, snaps open the hinged portion 93 of the body, removes the cartridge 100 and attached nozzle 120, places a new cartridge with nozzle attached in position, and pivots the hinged portion 93 closed for the next operation.

It will be evident that the dispenser mechanism 16 can be incorporated in the center fill tool 22 together with automatic sequencing means to initiate feeding after the cylinder 23 is expanded, if desired. The dispenser system of FIGS. 5–7 need only be reconfigured to fit within the available volume at the upper end of the center fill tool 22, which itself may be lengthened to accommodate the structure if desirable.

Figure 8:
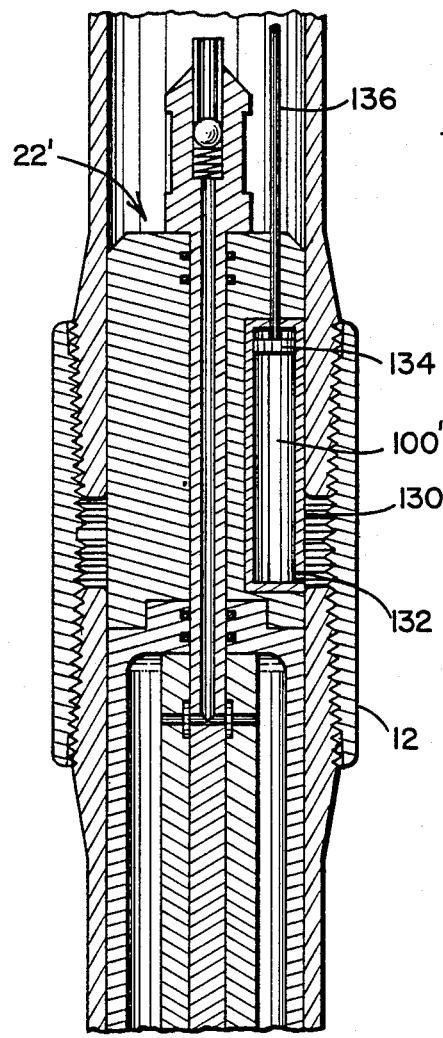
FIG. 8 is a side sectional view of a modified center fill tool incorporating an integral dispenser system.

It may also be useful in a number of instances to utilize a mechanical resin delivery system that is integral with the center fill tool, and such a system is shown in the partial view of FIG. 8, to which reference is now made. The upper body of the center fill tool 22' includes a hinged side door 130 within which a double barreled cartridge 100' of the type previously described, including suitable amounts of resin and catalyst, can be fitted. Small valves at the outlet ends of the barrels of the cartridge lead to an integral mixing chamber and outlet nozzle 132, in the side wall of the center fill tool that leads to the J area in the coupling. A reciprocable piston mechanism 134 within the top end of the center fill tool 22' is coupled to an exterior axial handle 136. In the present example handle 136 is manually operated to urge the driver piston against the slidable O-ring seals within the cartridge 100' at the appropriate time in operation. However, a mechanical device, a weighted device, or hydraulic pressure could be used for the same purpose. Again, measured amounts of resin and catalyst, thoroughly intermixed, are fed into the J area and the coupling is then made up with the upper tubing or casing section. After the center fill tool 22' is pulled out of the upper tubing or casing section, the hinged side door 130 is opened, the disposable cartridge 100' and integral nozzle are removed and a new unit is put into place, after which the hinged side cover 130 is again closed for the next operation (the handle 136 having been moved back up to the initial position).

While there have been described above and illustrated in the drawings, various forms and modifications in accordance with the invention, it will be appreciated that the invention is not limited thereto but encompasses all modifications and variations within the scope of the appended claims.

What is claimed is:

1. A system for operation during makeup of successive tubing or casing sections where a first tubing or casing section has a coupling collar threaded onto an open end and a second tubing or casing section is added to the first tubing or casing section through the coupling collar to form an anticipated gap area that will exist between opposed nose ends of the tubing or casing sections within the collar when makeup has been completed, comprising:

a cylindrical member insertable within the tubing or casing sections and including means for releasably engaging the inner wall of the first tubing or casing section in sealing relation on one side of the anticipated gap area opposite the collar, and including further a rigid member having an outer diameter slightly less than the inner diameter of the tubing or casing section and spanning the anticipated gap area between opposed nose ends:

means for filling the area about the rigid surface within the anticipated gap area with a catalyzed resin in liquid form; and means for removing the inserted member from the open end of the added, second tubing or casing section on the opposite side of the gap area from the first tubing or casing section and past the gap area after solidification of the resin.

2. The invention as set forth in claim 1 above, wherein the means for releasably engaging the cylindrical member comprises an inflatable cylindrical surface and an interior chamber for receiving a pressurizing fluid, and wherein the system further comprises means including conduit means for injecting a pressurizing fluid into the interior chamber, and means positionable proximate to the open end of the added, second tubing or casing section for gripping the end of the cylindrical member proximate to the open end of the second tubing or casing section to withdraw it past the anticipated gap area through the added, second tubing or casing section.

3. The invention as set forth in claim 2 above, wherein the cylindrical member comprises a central member displaceable relative to the cylindrical member, said central member being grippable at a first end proximate to the open end of the added, second tubing or casing section by a retrieving tool and slidable with respect to the outer member from a first position in which the cylindrical surface is pressurized and expanded to a second position, the system further including valve means venting interior pressurized fluid from the interior chamber when the central member is shifted to the second position.

4. A system for operation during makeup of successive vertically aligned tubing or casing sections where a lower tubing or casing section has a coupling collar threaded onto an open end and an upper tubing or casing section is added to the lower tubing or casing section through the coupling collar to form an anticipated gap area that will exist between opposed nose ends of the tubing or casing sections within the collar when makeup has been completed, comprising:

a cylindrical member insertable within the tubing or casing sections and including means for releasably engaging the inner wall of the lower tubing or casing section in sealing relation below the anticipated gap area, and including further a rigid member having an outer diameter slightly less than the inner diameter of the tubing or casing section and spanning the anticipated gap area between opposed nose ends;

means for filling the area about the rigid surface within the anticipated gap area with a catalyzed resin in liquid form; and means for removing the inserted member from the open end of the upper tubing or casing section on the opposite side of the gap area from the lower tubing or casing section and past the gap area after solidification of the resin.

5. The invention as set forth in claim 4 above, wherein the means for releasably engaging the cylindrical member comprises an inflatable cylindrical surface and an interior chamber for receiving a pressurizing fluid, and wherein the system further comprises means including conduit means for injecting a pressurizing fluid into the interior chamber, and means positionable proximate to the open end of the upper tubing or casing section for gripping the upper end of the cylindrical member proximate to the open end of the upper tubing or casing section to withdraw it past the anticipated gap area vertically through the upper tubing or casing section.

6. The invention as set forth in claim 5 above, wherein the cylindrical member comprises a central member displaceable vertically relative to the cylindrical member, said central member being grippable at a first end proximate to the open end of the upper tubing or casing section by a retrieving tool and slidable with respect to the outer member from a first position in which the cylindrical surface is pressurized and expanded to a second position, the system further including valve means venting interior pressurized fluid from the interior chamber when the central member is shifted to the second position.

* * * * *